United States Patent [19]
Nicole

[11] Patent Number: 5,469,286
[45] Date of Patent: Nov. 21, 1995

[54] OPTOELECTRONIC INSTALLATION FOR THE INTERCONNECTION OF ELECTRONIC MODULES AND A CORRESPONDING OPTOELECTRIC CONNECTOR

[75] Inventor: Pierre Nicole, Saint Cloud, France

[73] Assignee: Dassault Electronique, Saint Cloud, France

[21] Appl. No.: 142,053

[22] Filed: Oct. 28, 1993

[30] Foreign Application Priority Data

Nov. 13, 1992 [FR] France .................................. 92 13705

[51] Int. Cl.⁶ .................................................. H04B 10/20
[52] U.S. Cl. ........................... 359/163; 359/153; 359/159; 359/161
[58] Field of Search ...................... 359/110, 152, 359/153, 159, 161, 163, 180, 189, 117, 128, 139

[56] References Cited

U.S. PATENT DOCUMENTS

| | | | |
|---|---|---|---|
| 4,850,044 | 7/1989 | Block | 359/159 |
| 4,864,651 | 9/1989 | Oginara | 359/161 |

FOREIGN PATENT DOCUMENTS

| | | | |
|---|---|---|---|
| 0463390A3 | 1/1992 | European Pat. Off. | |
| 4203929 | 8/1993 | Germany | 359/161 |
| 0288529 | 12/1986 | Japan | 359/159 |

OTHER PUBLICATIONS

Journal of Lightwave Technology; vol. 9, No. 12, Dec. 1991, pp. 1733–1741 (Performance of Lightwave Interconnection et al) Sakano et al.
Journal of Lightwave Technology, vol. 9, No. 12, Dec. 1991, pp. 1764–1773 (Optical Interconnection for Advanced et al) Parker, James W.

*Primary Examiner*—Leslie Pascal
*Attorney, Agent, or Firm*—Nixon & Vanderhye

[57] ABSTRACT

The first receiver element includes a detector element subdivided into first and second detector subelements each having a photosensitive section of a general elongate rectangular shape and disposed longitudinally opposite the radiation emitted by the first emitter element, the first and second detector subelements being disposed next to each other on their longer sides, with their substep chosen to be equal to, at most, strictly half the step of the first emitter element. An electronic receiving channel is assigned to the first or second detector subelement. Main switching means electrically connect the first or the second detector subelement to the electronic receiving channel according to a predetermined reception condition relating to the signals received by the said first and second detector subelements.

22 Claims, 12 Drawing Sheets

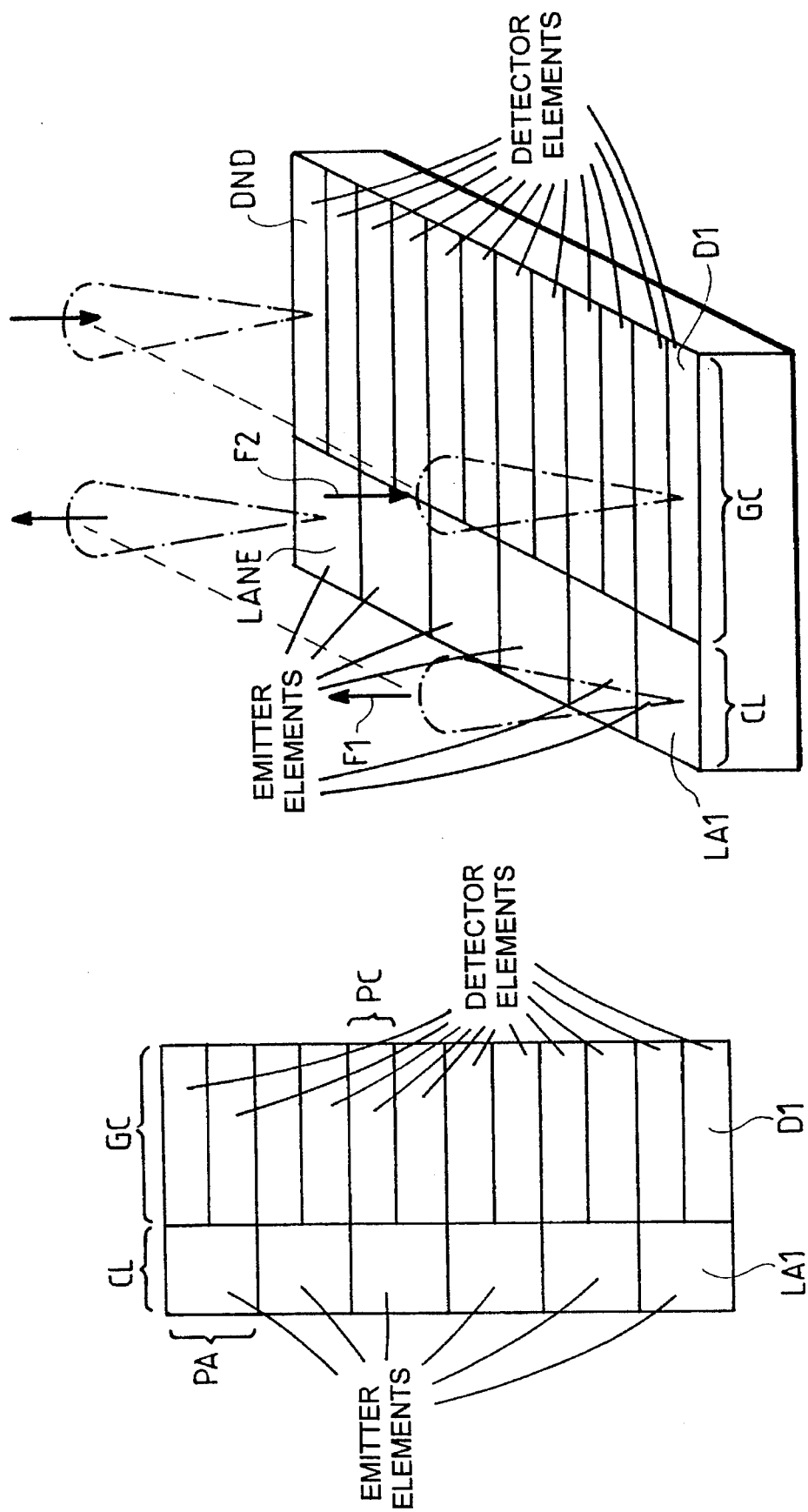

OPTOELECTRONIC INSTALLATION FOR THE INTERCONNECTION OF ELECTRONIC MODULES AND A CORRESPONDING OPTOELECTRIC CONNECTOR

FIELD OF THE INVENTION

The invention concerns the optical interconnection of electronic modules. It finds a general application in the transmission of digital and/or analog data between electronic modules such as cards of electronic components or of electronic subsystems.

PRIOR ART

Optoelectronic installations for the optical interconnection of electronic modules are known.

They comprise for example:

a first optical emitter element associated with a first module and fed by a first outgoing signal to be transmitted between the said first module and a second module; and a first optical receiver element associated with the second module, energized by the radiation emitted by the first emitter element and delivering a first incoming signal to the said second module; the first and second modules being positioned relative to each other according to a predetermined geometrical relationship.

In spite of the well known advantages of optical transmissions, such an installation for the transmission in open space is difficult to use in practice because of the problems of implementation and use such as, for example:

the relative mechanical position of the modules which must be very accurate to permit a correct data transmission;

the differential thermal expansion of the module which modifies this relative mechanical position of the modules;

the level of the emitted and received signals which varies with respect to time, in accordance with temperature; and the emitter element which may deteriorate progressively or suddenly.

OBJECT OF THE INVENTION

It is an object of the present invention to provide an installation of the above mentioned type which involves a solution for these problems.

It is a further object of the invention to provide an optoelectronic emitter/receiver connector for the operation of the installation.

SUMMARY OF THE INVENTION

According to a first aspect of the invention, the first receiver element includes;

at least one detector element subdivided into at least first and second detector subelements each having a photosensitive section of a general elongate rectangular shape and disposed longitudinally opposite the radiation emitted by the first emitter element, the first and second detector subelements being disposed next to each other on their longer sides, with their substep chosen to be equal to at most, strictly half of the step of the first emitter element;

an electronic receiving channel assigned to the first or second detector subelements; and main switching means capable of electrically connecting the first or the second detector subelement to the electronic receiving channel in accordance with a predetermined reception condition relating to the signals received by said first and second detector subelements, which allows said electronic receiving channel to deliver the first incoming signal to the second module in spite of a relative transverse or longitudinal displacement between the first and second modules.

The use of detector subelements of a general elongate rectangular shape ensures a relaxation of the mechanical tolerances in the direction of a relative longitudinal displacement between the first and second modules, while the switching of the first or second detector subelement according to a predetermined reception condition of the signals received resolves the problems of the relative transverse displacement between said first and second modules.

In a preferred form of the first aspect, the predetermined reception condition includes a comparison of the level of the signals received by the first and second detector subelements relative to a predetermined threshold, the main switching means switching the received signals for which the result of the comparison is positive towards the electronic receiving channel.

It should be observed that the result of this comparison, which constitutes important information regarding the reception of the received signals as well as regarding the emission of the incident signals, will serve, as mentioned below, in a protocol by connectors in accordance with the invention.

Advantageously, when the first and second modules face each other, the face of the second electronic module, which includes the first receiver element, also includes a second receiver element which is fed by a second outgoing signal to be transmitted between the second module and the first module, while the face of the first electronic module which includes the first emitter element also includes a second receiver element arranged according to the above mentioned first aspect or the above mentioned preferred form thereof, energized by the radiation emitted by the second emitter element and delivering a second incoming signal to the first module, which permits a bilateral transmission of data between the first and second electronic modules.

According to a second important aspect of the invention, the optoelectronic connector arranged in the form of a specific emitter/receiver circuit includes, on the emitter side:

at least one linear bar constituted by a predetermined number of emitter elements having a chosen emitter step;

a plurality of electronic emission channels assigned to said emitter elements; and emitter processing means for the said electronic emission channels, and on the receiver side:

at least one linear bar constituted by a predetermined number of detector elements subdivided into detector subelements arranged according to the above mentioned first aspect or to the above mentioned preferred form thereof, the detector bar being positioned according to a predetermined geometrical relationship relative to the emitter bar;

a plurality of electronic receiving channels assigned to the detector elements;

main switching means capable of electrically connecting one or the other of the detector subelements of each detector element to their associated electronic receiving channel according to the reception condition in accordance with the preferred form of the first aspect; and receiver processing means of said electronic receiving channels.

In practice, each electronic receiving channel includes a preamplifier element including an input connected to the output of the main switching means and an output connected to the receiver-processing means.

According to a further feature of the invention, the number of emitter elements is greater than the number of electronic emission channels and than the number of signals to be transmitted, and provision is moreover, made for emitter switching means capable of electrically connecting the electronic emission channels to chosen emitter elements, which makes it possible to obtain standby emitter elements initially not assigned to electronic emission channels and which are capable of taking the place of the emitter elements that no longer emit.

In practice, each electronic emission channel includes a preamplifier element including an input connected to the output of the emitter switching means and an output connected to the associated emitter element.

According to a first preferred embodiment of the invention, when an electronic emission channel is assigned to an emitter element that is no longer emitting, the emitter switching means switch the electronic emission channels to another operative emitter element and adjacent to the one that is failing, and connect the other electronic emission channels by a contiguous displacement to the other available emitter elements and, moreover to a chosen standby emitter element.

According to a second preferred embodiment of the invention, when an electronic emission channel is assigned to an emitter element which is no longer emitting, the emitter switching means switch the electronic emission channel to an operative standby emitter element which is chosen at random.

According to another feature of the invention, the number of detector elements is greater than the number of electronic receiving channels and greater than the number of signals to be received, and provision is moreover made for auxiliary switching means disposed between the main switching means and the electronic receiving channel and comprising a plurality of auxiliary switches arranged according to a binary branched chain allowing the signals coming from the main switching means to be switched to chosen electronic receiving channels.

Preferably, the emitter- and receiver-processing means are accommodated in a microcontroller.

The emitter elements may be LASER diodes.

Alternatively the detector elements may be PIN type photodiodes.

In another embodiment of the invention, the emitter elements are produced in a semiconductor alloy technology such as Gallium arsenide (GaAs), or Gallium arsenide doped with Indium (GAInAsP).

In still another embodiment of the invention, the emitter elements are produced in a semiconductor technology such as porous silicon or silicon carbide.

In one embodiment of the inventions, the detector elements are produced in a semiconductor alloy technology such as Gallium arsenide (GaAs), or Gallium arsenide doped with Indium (GAInAsP).

In practice, the detector elements are produced in a semiconductor technology such as silicon.

In one embodiment of the invention, the microcontroller is produced in a semiconductor technology such as silicon.

In another embodiment of the invention, the microcontroller is produced in a semiconductor alloy technology such as Gallium arsenide (GaAs), or Gallium arsenide doped with Indium (GAInAsP).

Preferably, the emitter and/or detector bars are bonded or connected by connecting wires to the microcontroller.

In a variant, the emitter and/or detector bars are integrated into the technology of the microcontroller.

According to another aspect of the invention, near the external face of the connector, there is placed an optical unit having chosen optical properties such as transmission, focusing, diffraction and/or refraction of the light beams.

The invention also provides an installation wherein the first and second connectors are arranged according to the above mentioned second aspect of the invention and are disposed relative to each other according to a predetermined geometrical relationship.

According to an important characteristic of the invention, provision is made for a first information feedback from the second connector for the benefit of the first connector, using a first test signal emitted by the second connector for the attention of the first connector and representing the failing emitter elements of the first connector detected in the vicinity of the second connector by checking the reception condition according to the above mentioned preferred form of the first aspect, the emitter switching means as well as the main and auxiliary switching means of the first connector organising the assignment of the electronic emission and reception channels of the first connector by means of this first test signal.

Very advantageously, provision is moreover made for a second information feedback from the first connector for the benefit of the second detector using a second test signal emitted by the first connector for the attention of the second connector and representing failing emitter elements of the second detector detected in the vicinity of the first connector by checking the reception condition according to the above mentioned preferred form of the first aspect of the invention, the emitter switching means as well as the main and auxiliary switching means of the second connector organising the assignment of the electronic emission and reception channels of the second connector by means of this second test signal.

Preferably, the first and second connectors each include a communication protocol wherein provision is made, before any transmission of useful data, for:

a detection on one or several detector elements of the received radiations to check whether a second connector circuit is transmitting; and in the affirmative, an emission at the level of the said first connector on one or several emitter elements of outgoing signals to the destination of the second connector circuit so as to be recognized by the said second connector circuit.

In practice, in the case of the emission of outgoing signals, provision is moreover made for monitoring the strength of the said signals relative to a predetermined threshold.

BRIEF DESCRIPTION OF THE DRAWINGS

Other objects, characteristics and advantages of the invention will emerge in the light of the detailed description given below, and in the light of the accompanying drawings wherein:

FIGS. 8(a) and 8(b) are plan and perspective schematic representations of a connector with bars disposed on the same substrate, in accordance with the invention;

DETAILED DESCRIPTION OF THE PREFERRED EMBODIMENT

Figure 1:
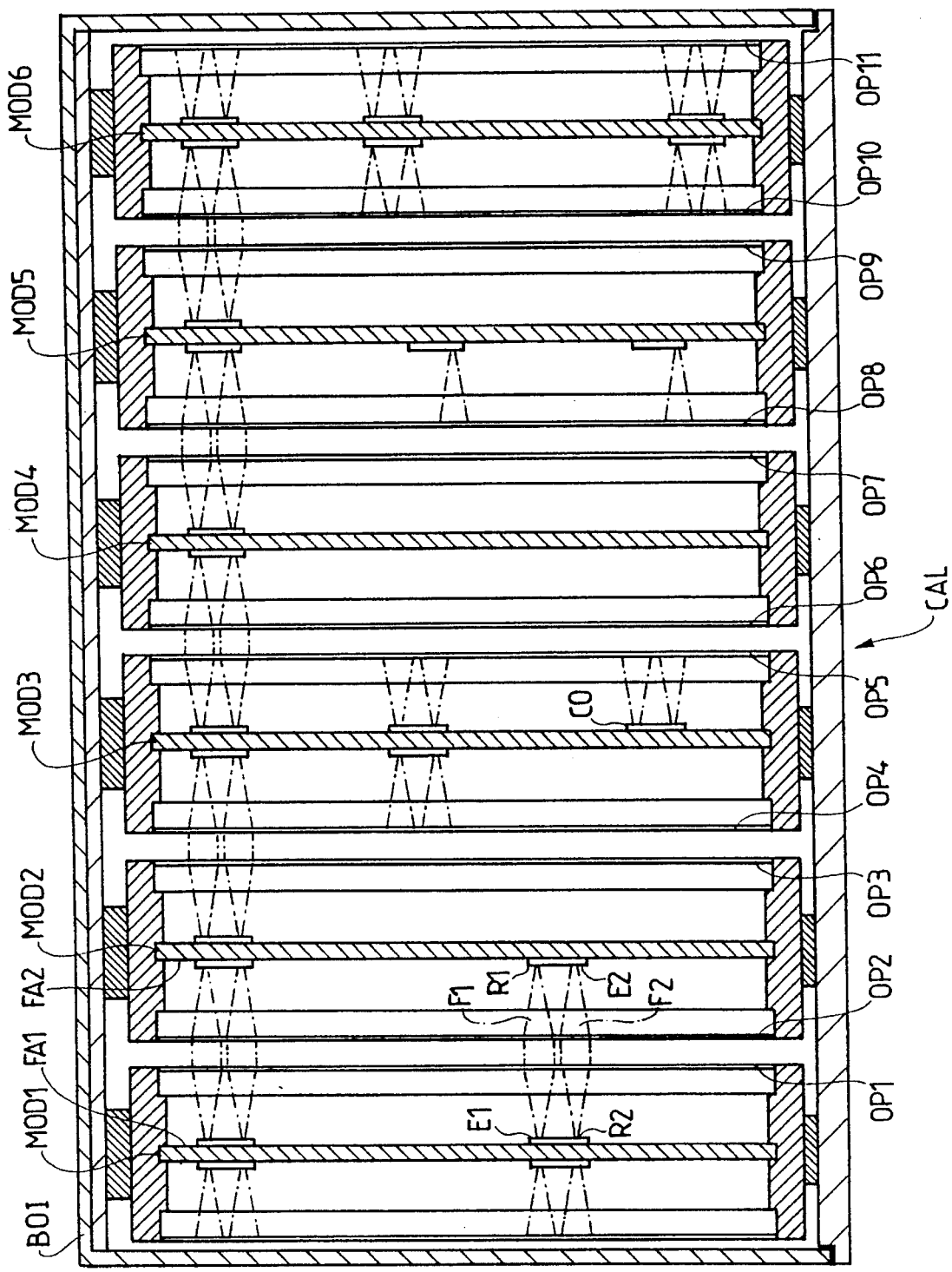
FIG. 1 is a block diagram of a computer using an installation in accordance with the invention.

FIG. 1 shows, in cross-section, a casing BOI of an electronic computer which is produced by means of six electronic modules individually shown at MOD1 to MOD6. Electronic components interconnected by tracks are mounted on the modules. The modules MOD1 to MOD6 are plugged in side by side with their faces parallel to each other.

For example, the face FA1 of the module MOD1 is opposite the face FA2 of the module MOD2.

To allow a connection (with a fast digital information flow for example) between the modules without using pin connectors, or a hardware conductor, the invention makes provision on the one hand on the face FA1, for a first optical emitter element E1 connected to a first module MOD1 and fed by a first outgoing signal SD1 to be transmitted between the two modules MOD1 and MOD2, and on the other hand, on the face FA2, for a first receiver element R1 connected to the module MOD2 and energized by the radiation F1 emitted by the emitter E1 and delivering a first incoming signal SA1 to the second module MOD2.

Very advantageously, to allow a bilateral transmission, the face FA2 also supports a second emitter element E2 fed by a second outgoing signal SD2 to be transmitted between the modules MOD1 and MOD2, while the face FA1 also includes a second receiver element R2 energized by the radiation F2 emitted by the second emitter element E2 and delivering a second incoming signal SA2 to the module MOD1.

As will be seen in detail below, optical units OP individually shown at OP1 to OP11 are plugged in near the modules. These optical units OP have the function of ensuring in particular a better optical transmission of the radiations F1 and F2 between the modules.

It is clear that the invention also applies to installations wherein the modules are plugged in side-by-side with their faces forming, for example, a predetermined angle between each other; this is the case for example, with modules disposed in a star configuration.

In this case, the optical units OP are constituted, for example, by prisms to ensure an optical transmission in free space between the various modules forming the arms of the star.

To allow the first receiver element R1 (as well as the second receiver element R2, if applicable) to deliver the first incoming signal SA1 (and, respectively, the second incoming signal SA2, if applicable) in spite of a transverse or longitudinal displacement between the modules MOD1 and MOD2, provision is made in accordance with the invention for the first receiver element R1 (and the second receiver element R2, if applicable) to comprise:

at least one detector element subdivided into at least first and second detector subelements each having a photosensitive section of a general elongate rectangular shape and disposed longitudinally opposite the radiation F1 emitted by the first emitter element E1, (the emitter element E2 if applicable) the first and second detector subelements being disposed next to each other on their longer sides, with their substep chosen to be equal at most to strictly half the step of the first emitter element E1 (the emitter element E2 if applicable);

an electronic receiving channel assigned to the first or second detector subelements; and main switching means capable of electrically connecting the first or the second detector subelement to the electronic receiving channel in accordance with a predetermined reception condition relating to the signals received by the first and second detector subelements.

The subdivision of a detector element into two, three or more detector subelements makes it possible to avoid having two incident light beams of two adjacent optical channels on the same photosensitive surface of one detector element during a slip of the light beams due to thermomechanical effects of the modules. Without this subdivision, the signals are not correctly restored.

The subdivision of the detector elements has another advantage because it reduces the photosensitive surface associated with a light beam, and thus reduces the associated stray capacitance, which makes it possible to increase the band width of the detector subelement.

Very advantageously, the emitter and receiver elements described above are integrated into the same specific emitter/receiver circuit forming the optoelectronic connector.

The main elements of an optoelectronic connector in accordance with the invention have been represented in FIGS. 2A, 2B, 2C, 2D and 3.

In practice, the optoelectronic connector circuit CO includes on the emitter side:

at least one linear bar BAE constituted by a predetermined number NE of emitter elements LA having a chosen emitter step PA;

a plurality of electronic emission channels VOXE assigned to the emitter elements LA;

emitter-processing means for the electronic emission channels.

On the receiver side, the connector in accordance with the invention includes:

at least one linear bar BAD constituted by a predetermined number ND of detector elements PIX subdivided into detector subelements D1, D2 arranged according to the above mentioned characteristics. The detector bar BAD is positioned according to a predetermined geometrical relationship relative to the emitter bar BAE.

Figure 2:
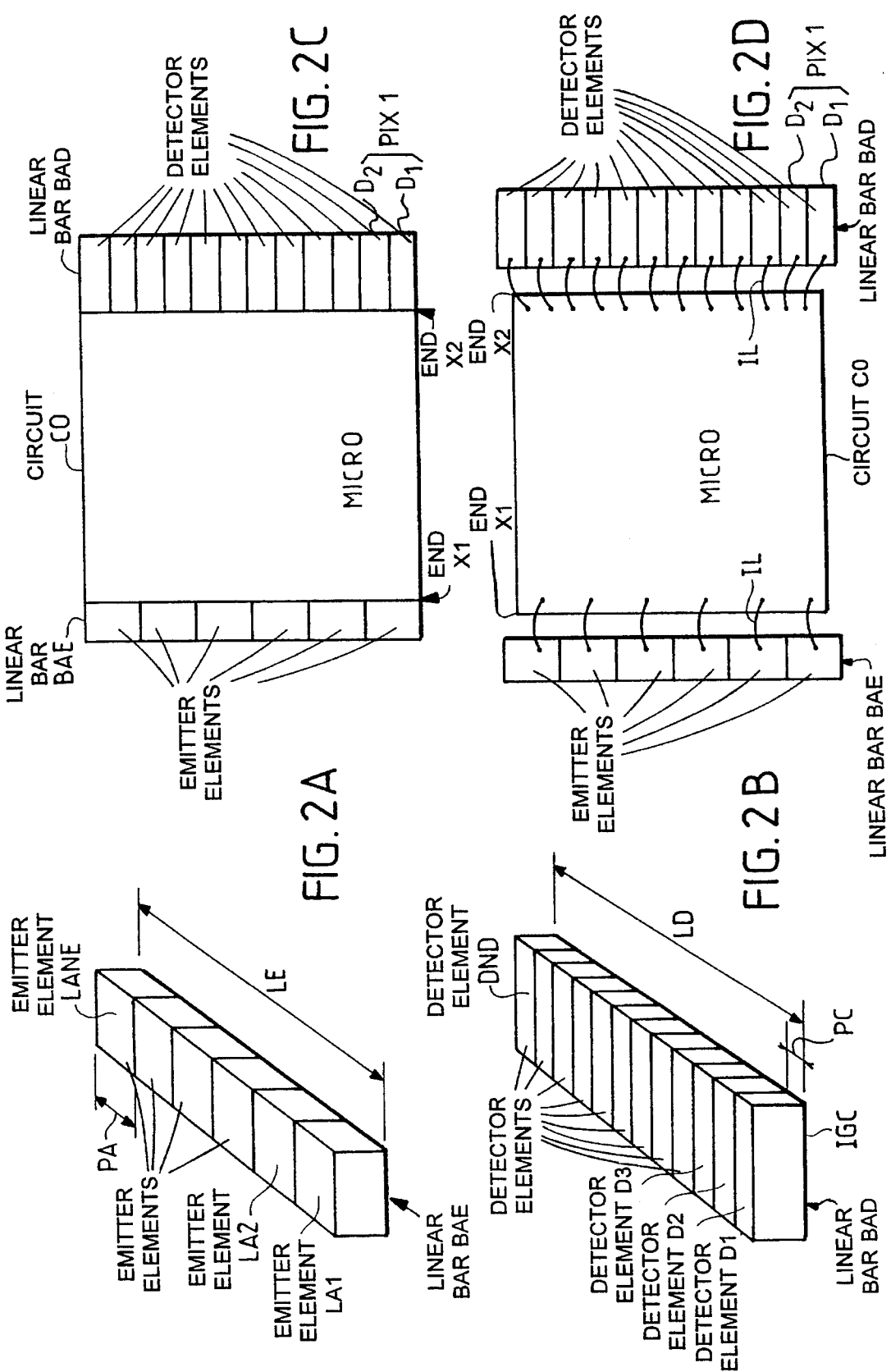
FIGS. 2A, 2B, 2C and 2D are schematic representations of the elements of an optoelectronic connector in accordance with the invention.

In FIGS. 2C and 2D, the emitter bar BAE is positioned at a first end X1 of the circuit CO while the detector bar BAD is positioned in the same plane as the emitter bar BAE, with an identical orientation and at the end X2 on the opposite side to the circuit CO.

Provision is moreover made for a plurality of electronic receiving channels VOXR assigned to the detector elements PIX.

Finally, main switching means COMD of each detector element PIX1 electrically connect one or the other of the detector subelements to their associated electronic receiving channel VOXR1 according to a predetermined condition relating to the signals received by the detector subelements D1, D2.

Provision is also made for means for the processing on the receiver side of the said electronic receiving channels.

The linear bar BAD has a length LD that is substantially equal to that LE of the emitter bar BAE.

The number ND of the detector elements D is advantageously at least strictly equal to twice that of NE.

To mitigate the drawback related to the longitudinal displacement between two modules, the detector subelements D1, D2 . . . DND each have a photosensitive section of an elongate rectangular shape and disposed longitudinally opposite the radiation emitted by an emitter bar which is, for example, facing the detector bar.

The detector subelements D1 to DND are disposed next to each other on their longer sides GC.

In FIG. 2B, the detector subelements have their substep PC chosen to be equal to half the step PA of the emitter bar BAE.

Of course, one is here concerned with one embodiment of the invention. In practice, the invention is also suitable when the substep PC is equal to one third of the step PA.

For example, the substep PC of the emitter elements LA is of the order of 380 micrometres to 250 micrometres.

As a corollary, the substep PC of the detector elements is of the order of 190 micrometres, or 125 micrometres to 127 micrometres, or 83 micrometres. Moreover, the long side GC of the detector elements is of the order of 1 to 3 mm. It is advantageously 1.5 mm.

For example, the detector elements are those sold by the British Company IPL, standing for "Integrated Photomatrix Limited".

In practice, the unit of the electronic receiving channels VOXR and emission channels VOXE, as well as the means for the processing of said channels, are accommodated in a circuit forming a microcontroller MICRO.

The bars BAE and BAD are connected to this microcontroller according to the conventional techniques used in electronics (FIGS. 2C, 2D).

For example, the bars BAE and BAD are bonded to the microcontroller MICRO by the technique of IL wires called "bonding wires" (FIG. 2D) or yet again by the technique termed "indium balls" (FIG. 2C).

Figure 3:
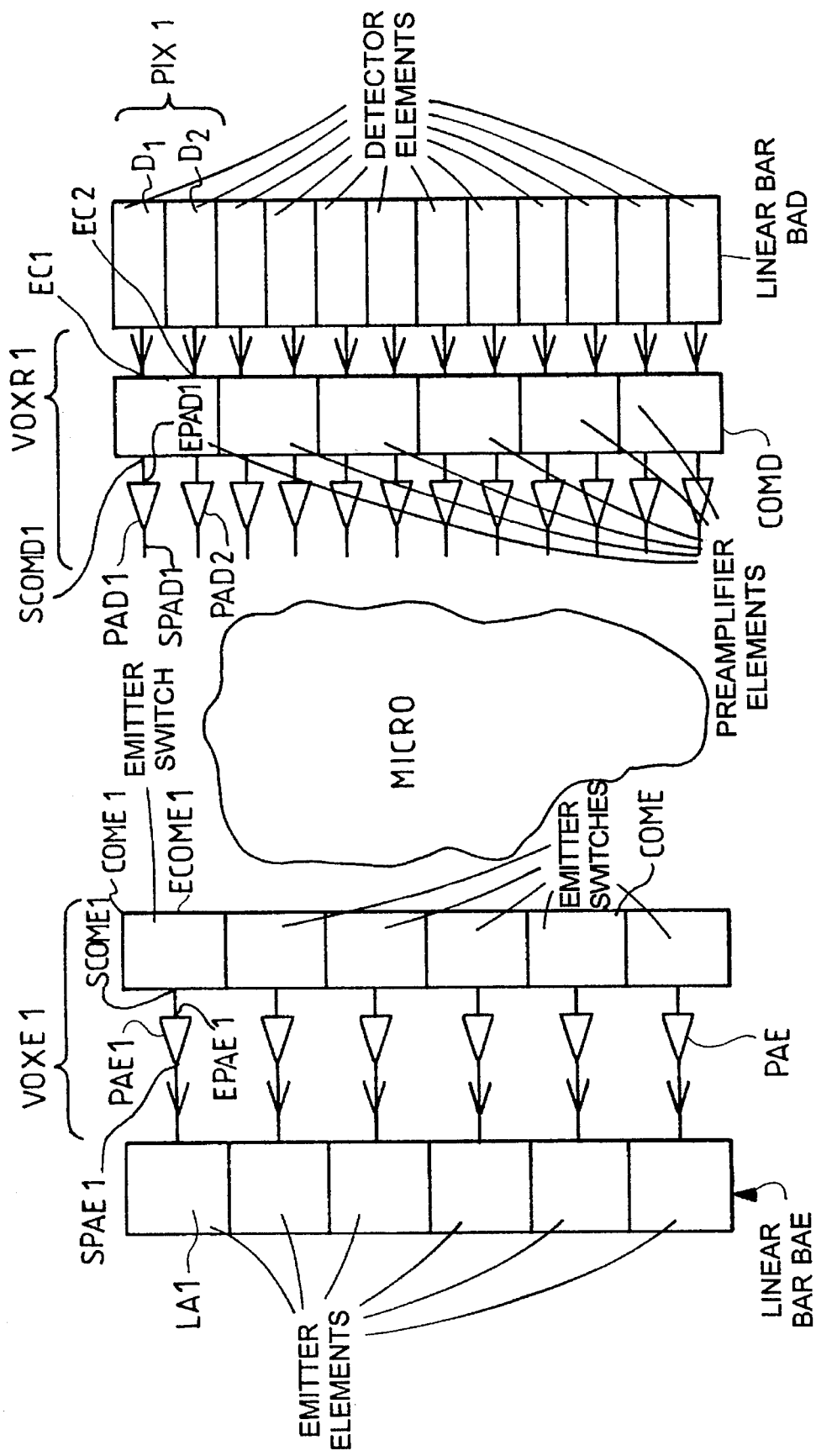
FIG. 3 is a schematic representation of the circuitry of the electronic emission and receiving channels of the connector in accordance with the invention.

The circuitry of the electronic emission and receiving channels has been represented in FIG. 3.

On the emitter side, each electronic emission channel VOXE1 includes a preamplifier element PAE1 comprising an input EPAE1 connected to the output SCOME1 of the emitter switching means COME1 and an output connected to the emitter element LA1.

The emitter-processing means MICRO apply the outgoing signal SD1 to the input ECOME1 of the emitter switch COME1.

The preamplifier PAE1 converts the voltage level of the outgoing signal SD1 coming from the microcontroller MICRO into a current level intended to feed the associated laser diode LA1.

In a preferred embodiment of the invention, the number NE of emitter elements LA is greater than the number of electronic emission channels VOXE and the number of signals SD to be transmitted.

In this case, it is advantageous for the emitter switching means to electrically connect the electronic emission channels VOXE to chosen emitter elements LA, which makes it possible to obtain standby emitter elements, not initially assigned to electronic emission channels and which are capable of taking the place of the failing emitter elements.

Thus, when an electronic emission channel VOXE is assigned to a failing emitter element, the emitter switching means COME switch the electronic emission channel VOXE to another available emitter element adjacent to the one that is failing and connect the other electronic emission channels to other available emitter elements by a contiguous displacement and, moreover, to a chosen standby emitter element.

As a variant, when an electronic emission channel VOXE is assigned to a failing emitter element, the emitter switching means COME switch the electronic emission channel VOXE to another standby emitter element that is chosen at random.

In the case where the emitter element is deteriorating progressively, its emission power is compensated until its power transistor cannot increase the current any further. If the emission power decreases still further while the emission power of the other emitter elements does not change, the emitter element is considered as not emitting any further and one of the two above mentioned solutions is chosen.

It should be observed that the switching block COME is preferably situated ahead of the block PAE so as not to have any currents inducing unduly high voltage losses in the emitter switches. As a result, the total surface occupied by the emitter switches can be reduced.

On the receiver side, each electronic receiving channel VOXR1 includes a preamplifier element PAD1 comprising an input EPAD1 connected to the output SCOMD1 of the main switching means COMD1 and an output SPAD1 connected to the receiver processing means MICRO.

The preamplifier PAD1 converts to a voltage level the current level of the incoming signal SA coming from the detector subelement D1 or from the detector subelement D2.

The main switch COMD1 has a first input EC1 connected to the detector subelement D1 and a second input EC2 connected to the detector subelement D2.

The predetermined reception condition relating to the signals received by the detector subelement D1 or the detector subelement D2 includes a comparison of the level of the signals received by the detector subelements D1 and D2 forming the detector element PIX1.

According to the invention, if the result of the comparison is positive, the main switching means COMD1 electrically connect the first input EC1 or the second input EC2 to the electronic receiving channel VOXR1 (that is to say, the input EPAD1 of the preamplifier PAD1).

As will be seen in greater detail below, the result of this comparison constitutes useful information regarding the reception of the received signal, as well as the emission of the incident signals.

In another embodiment of the invention, the number ND of detector elements PIX is greater than the number of electronic receiving channels VOXR and the number of the signals to be received.

Figure 4:
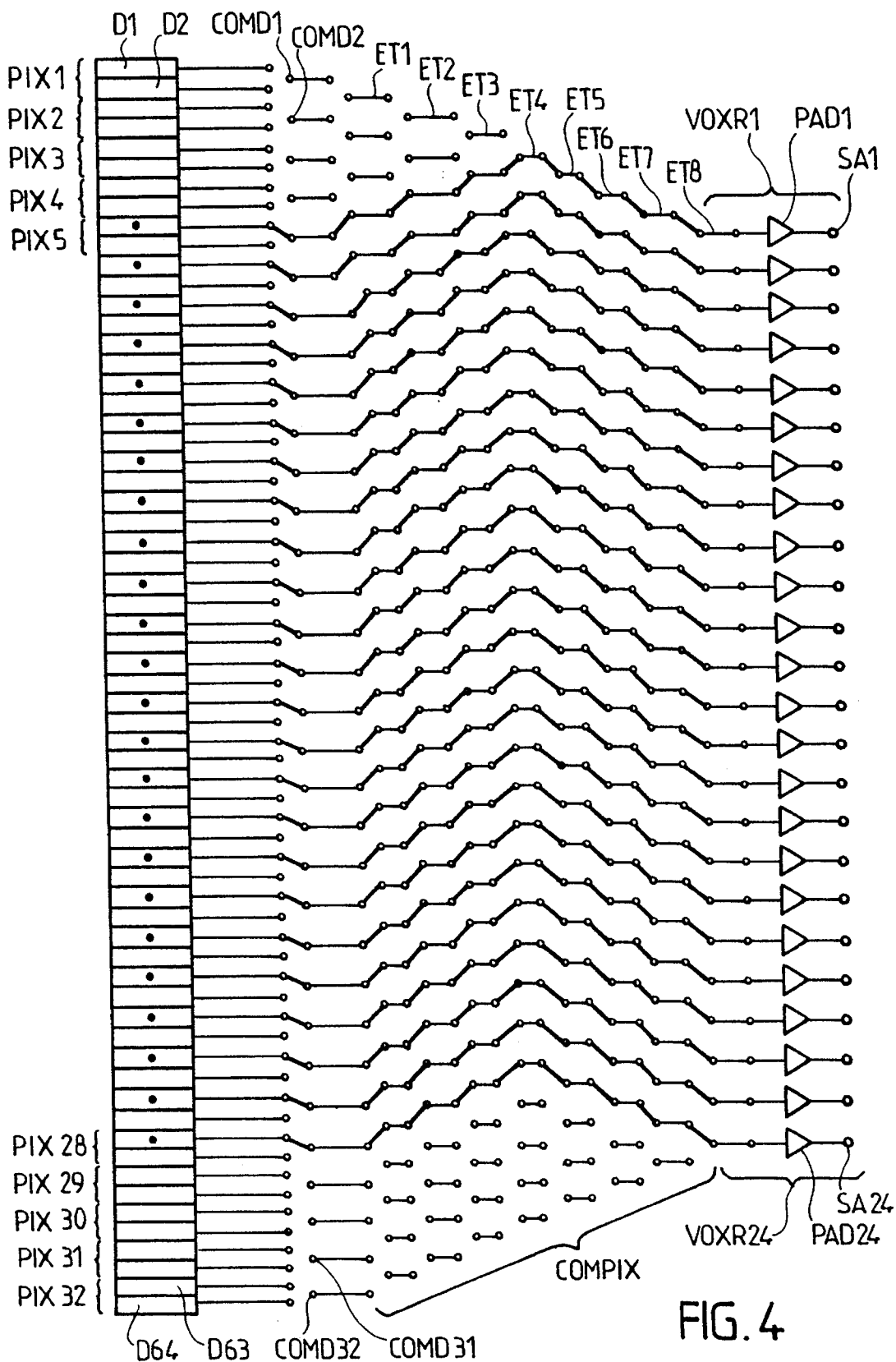
FIG. 4 is a schematic representation of the main and auxiliary switching means with 32 detector elements for 24 electronic receiving channels in accordance with the invention.

In FIG. 4, 24 electronic receiving channels VOXR have been represented and 32 detector elements PIX individually shown at PIX1 to PIX32, with each detector element PIX1 comprising two detector subelements D1 and D2.

As described with reference to FIG. 3, the main switching means COMD individually shown at COMD1 to COMD32 associated with the pair of detector subelements D1, D2; D3, D4; ... D63, D64 electrically connect one or the other of the detector subelements of each pair to their respective electronic receiving channel VOXR according to the above mentioned predetermined reception condition relating to the signals received.

According to the invention, provision is moreover made for auxiliary switching means COMPIX disposed between the main switching means COMD and the electronic receiving channels VOXR.

These auxiliary switching means COMPIX comprise a plurality of auxiliary switches arranged according to a binary branched chain making it possible to switch the signals coming from the main switching means COMD to the chosen electronic receiving channels VOXR.

Taking into account that there are here 32 detector elements for 24 electronic receiving channels, provision is made for 8 auxiliary switch stages arranged according to a binary branched chain.

In FIG. 4, the detector elements PIX5 to PIX28 receive incident beams represented by circular spots disposed substantially at the centre of the photosensitive section of each odd detector subelement of the detector elements.

It follows therefrom that the detector elements PIX1 to PIX4 and PLX29 to PLX32 are standby detector elements initially not assigned to any electronic receiving channels and capable of taking the place of detector elements corresponding to any failing emitter elements, as will be seen in greater detail below.

As described above, the main switching means COMD electrically connect all the odd detector subelements of the detector elements PIX5 to PIX28 to the inputs of the stage ET1.

Here it is considered for example, that it is the odd detector subelements of the elements PIX5 to PIX28 that check the above mentioned reception condition described with reference to FIG. 4.

The auxiliary switching means COMPIX electrically connect, in response to actuating orders which will be described in greater detail below, the signals coming from the main switching means COMD to the electronic receiving channels VOXR.

In FIG. 5, there will again be found the principal means described with reference to FIG. 4.

As compared with the configuration described with reference to FIG. 4, a transverse translation has been produced amounting to a deviation CUR of 2.5 substeps PC.

This translation CUR is due, for example, to a slip of the modules which respectively support the emitter element and the receiver element.

The translation of 2.5 substeps PC results in the translation of the incidence of the 24 light beams by a length equal to the deviation CUR.

Thus, the even detector subelement of the detector element PIX7 now receives a light beam, and so on as regards the even subelements up to the even subelement of the detector element PIX30.

As has been described above, the main switching means COMD electrically connect all the even detector subelements of the elements PIX7 to PIX30 to the inputs of the stage ET1.

In accordance with the invention the switching of the main switches COMD is effected following the check of the reception condition described with reference to FIG. 4.

The auxiliary switching means COMPIX electrically connect the signals coming from the main switching means COMD to the electronic receiving channels VOXR.

In accordance with the invention the switching of the auxiliary switching means COMPIX is effected in response to actuating orders coming from the microcontroller according to a switching logic which will be described in greater detail below.

In FIG. 6, there will again be found the principal means described with reference to FIG. 4.

As compared with the configuration described with reference to FIG. 4, a failure has occurred of the emitter element which energized the detector element PIX 19.

The failure of the emitter element corresponding to the detector element PIX19 entails, as its first consequence, the modification of the switching of the electronic emission channel assigned initially to the failing emitter to another operative emitter element (here the emitter element which corresponds to the detector element PIX20), and the modification of the organisation of the other electronic emission channels with the other available emitter elements by using, in addition, a standby emitter element, (which corresponds here to the detector element PIX29).

As another consequence of this failure, the even detector subelement of the detector element PIX29 now receives a light beam coming from the standby emitter element.

Indeed, the main switching means COMD19 no longer connect any signal to the inputs of the stage ET1 while the main switching means COMD29 now electrically connect the even detector subelement of the detector element PIX29 to an input of the stage ET1.

This switching COMD29 is always actuated after the reception condition mentioned above has been checked.

Finally, the auxiliary switching means COMPIX electrically connect the signals coming from the main switching means COMD to the chosen electronic receiving channels VOXR.

In accordance with the invention the switching of the auxiliary switches COMDIX is effected in response to the actuating orders delivered by the microcontroller according to a switching logic which will be described in greater detail below.

It will be observed that only the switching of the stages ET1 and ET2 has changed as compared with that of the stages ET1 and ET2 described with reference to FIG. 4.

Figure 5:
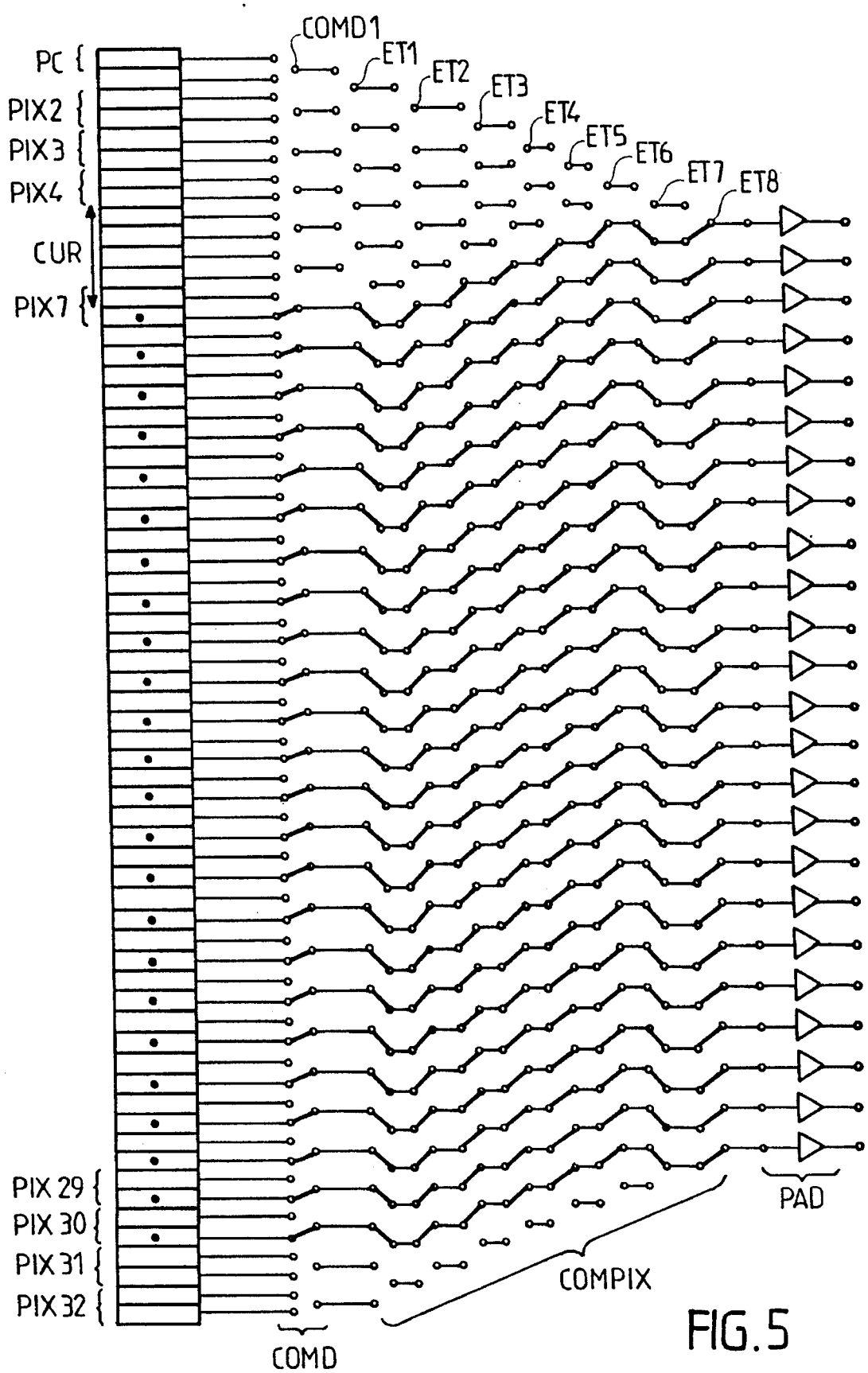
FIG. 5 is a schematic representation of the means described with reference to FIG. 4 with a reorganisation of the channels in accordance with the invention, following a slip.
Figure 6:
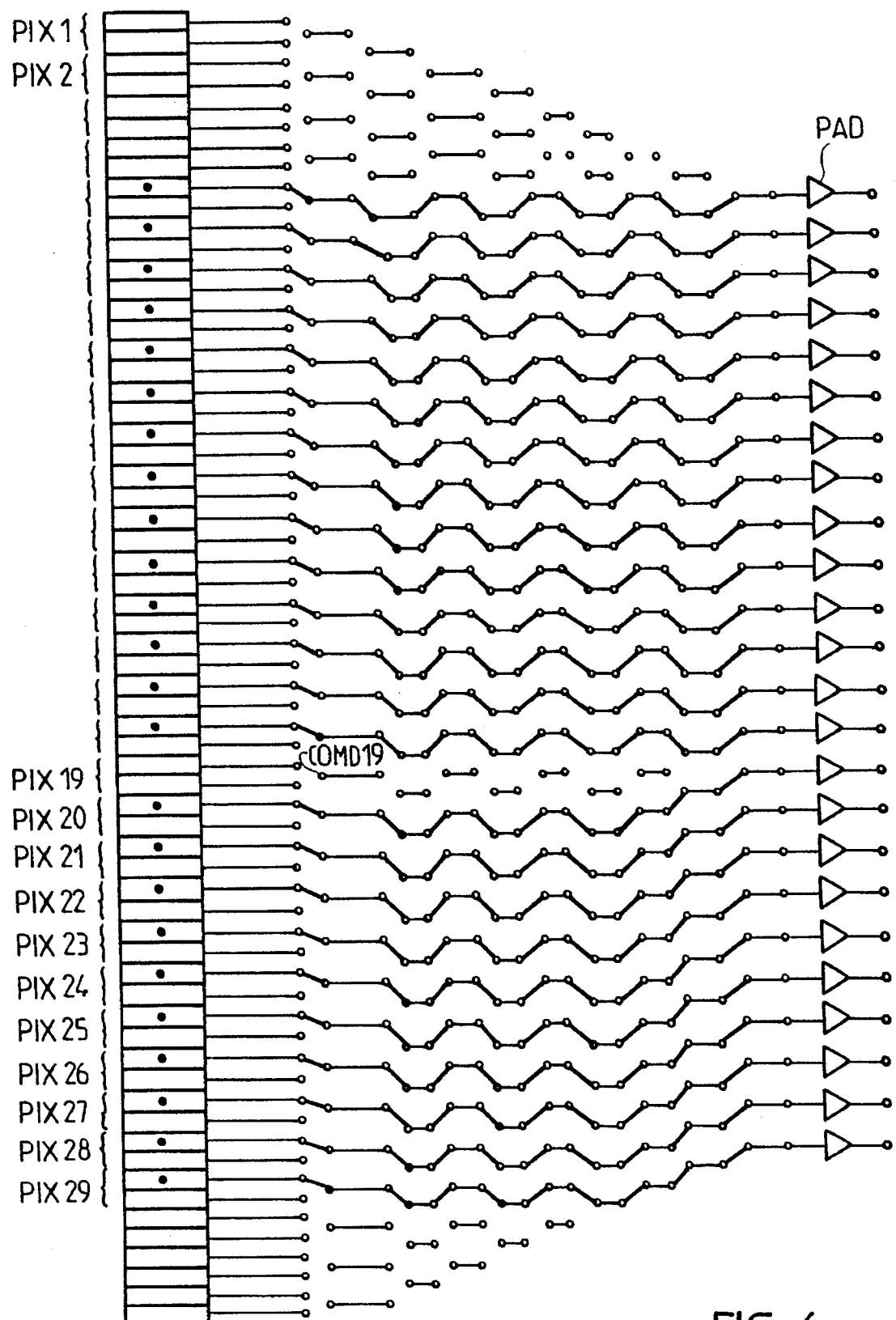
FIG. 6 is a schematic representation of the means described with reference to FIG. 4 with a reorganisation of the channels in accordance with the invention, following a failure of an emitter element.

The switching operations described with reference to FIGS. 5 and 6 can be effected successively in the case of a translation and in the presence of a failing emitter element.

Figure 7:
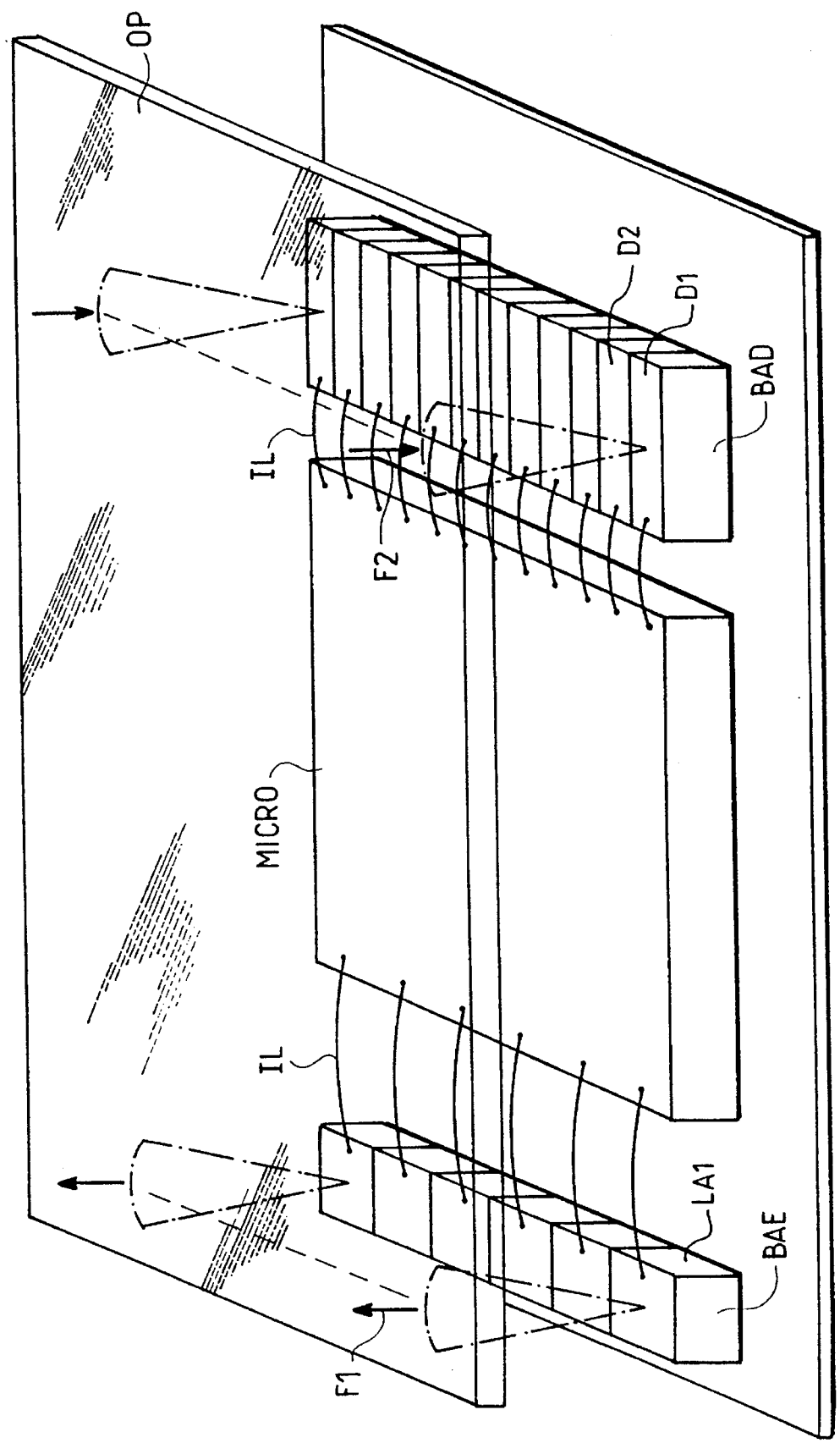
FIG. 7 is a schematic representation of the connector with separate bars in accordance with the invention and provided with a predetermined optical unit.

An embodiment of a connector in accordance with the invention has been represented in FIG. 7.

The connector circuit CO includes:

a bar BAE of LASER diodes produced in a silicon technology which are capable of emitting a conical light beam F1;

a bar BAD of PIN-type diodes which are capable of receiving a light beam F2; and a microcontroller circuit MICRO capable of processing the data coming from or passing to the electronic emission or receiving channels associated with the said bars.

The bars BAE and BAD are bonded to the microcontroller MICRO according to the technique of IL connecting wires.

The emitter and detector bars may be produced in a semiconductor alloy technology such as Gallium arsenide GaAs, or Gallium arsenide doped with Indium GAInAsP, or in a semiconductor technology.

For its part, the microcontroller is produced in a semiconductor alloy technology such as pure or doped Gallium arsenide, or yet again in a silicon-based semiconductor technology.

Advantageously, an optical unit OP is positioned near the external face of a connector in accordance with the invention.

An integrated circuit comprising on the same substrate, laser diodes LA1 to LANE and photosensitive diodes D1 to DND has been represented in FIGS. 8(a) and 8(b). The detector subelements DND have an elongate rectangular shape. The largest side GC of the detector subelements DND is for example, three times greater than that CL of the emitter elements LANE.

The step PA of the emitter elements is here chosen to be equal to twice that of the detector subelements PC.

Figure 9B:
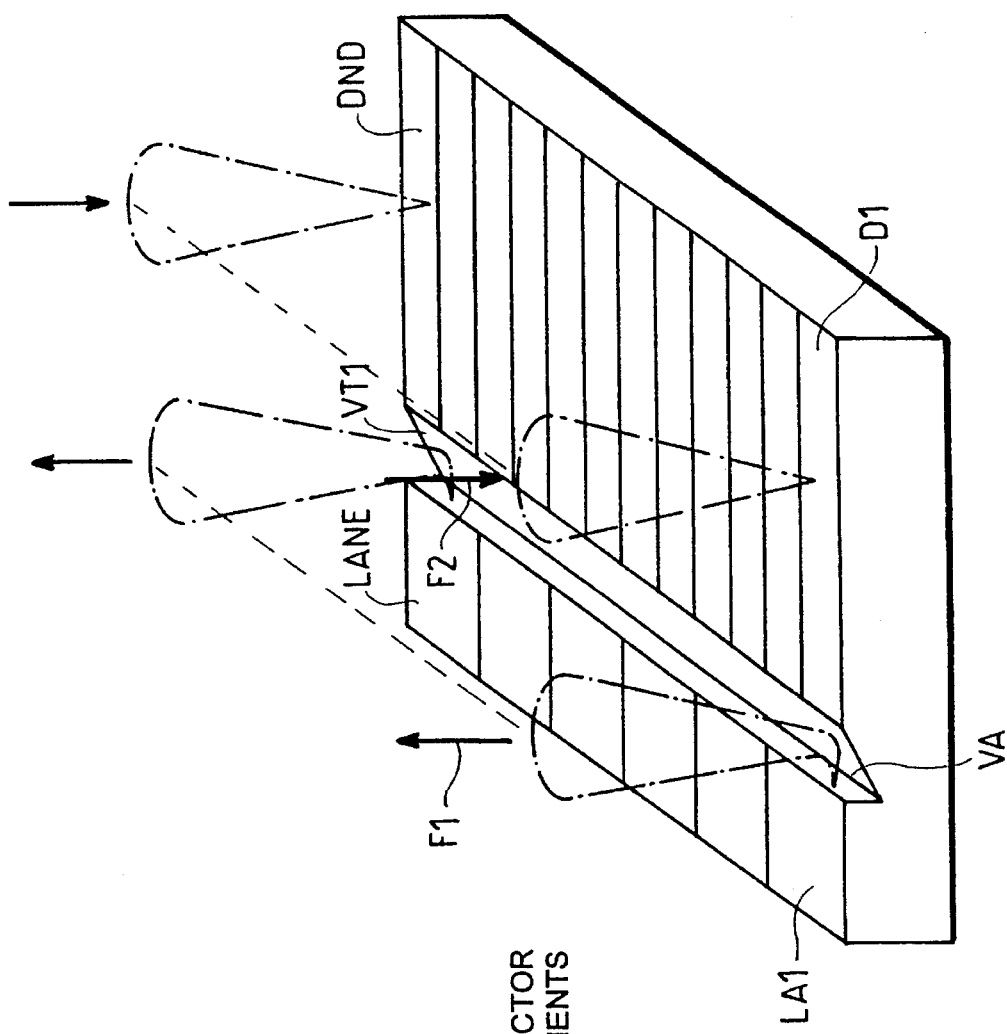
FIGS. 9(a) and 9(b) are plan and perspective schematic part of a connector with bars disposed on the same substrate, in accordance with the invention.
Figure 9A:
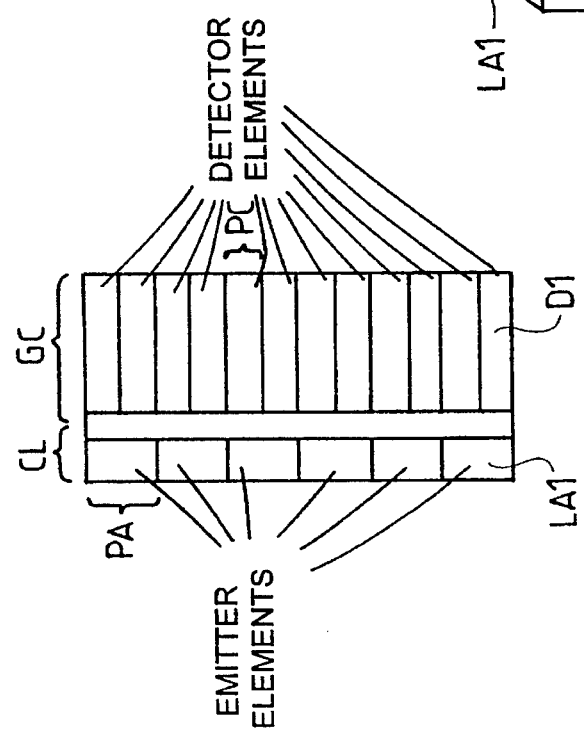

In FIGS. 9(a) and 9(b), a recess VA has been cut between the detector subelements DND and the emitter elements LANE. The flank VT1 on the detector side of the recess VA is reflective, so that the radiation F1 emitted by the edge of the emitter element is reflected in a direction parallel to that of the beam F2 which energizes the photosensitive zones of the detector diodes DND.

In practice, the connector in accordance with the invention is produced as a DIL ("DUAL IN LINE") casing with a chip carrier, a window, or CMS (Components Mounted on the Surface).

Figure 10:
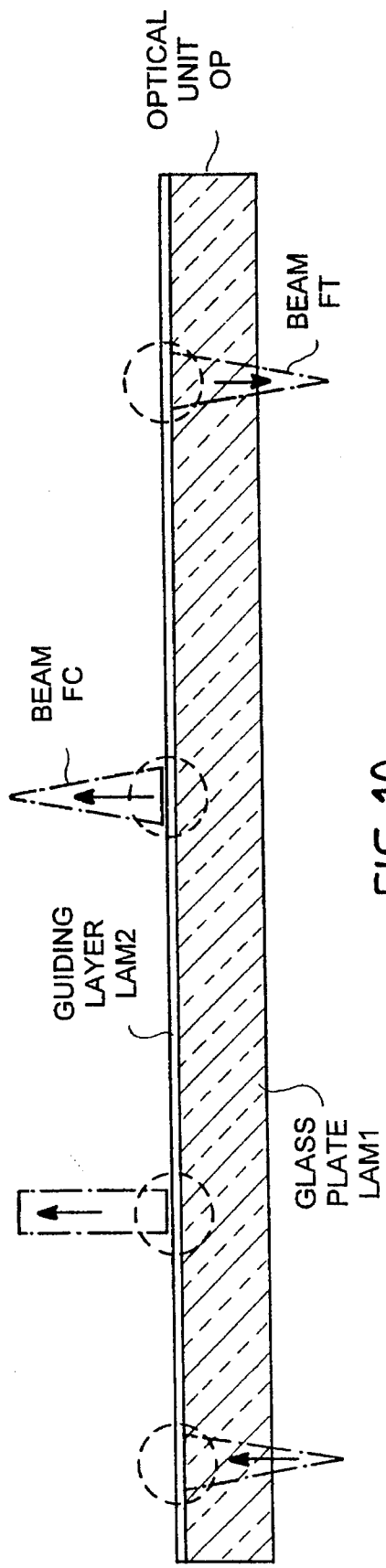
FIG. 10 is a schematic representation illustrating an example of an optical unit in accordance with the invention.

Reference is now made to FIG. 10.

Very advantageously, the connector is associated with at least one optical unit OP having chosen optical properties such as transmission, focusing, diffraction and/or refraction of the beams coming from the laser diodes and/or passing to the detector elements.

For example, the optical unit OP is constituted by a protective support such as a glass plate LAM1 supporting on one face a guiding layer made of a predetermined material LAM2.

The guiding layer LAM2 is, for example, constituted by a deposit of a polymer film followed by a matrix or several matrices blocked on in a hot state, corresponding to diffractive functions of the optical coupling such as a collimation of the beams FC towards the outside or a transverse collimation of the beams FT towards the inside.

As a variant, the guiding layer LAM2 is produced in part by a diffusion of ions by soaking in an ionic bath (profile of index decreasing with depth) followed by a dry etching (by an ion beam) or by chemical etching (by unmasking the portions where diffractive zones have to be created).

The optical unit OP may also include diffractive or refractive microlenses disposed on an appropriate carrier and capable of colligating a beam coming from a laser diode bar disposed on the module MOD1 and of focusing the beam onto a photodetector disposed on the module MOD2 for module to module transmission (FIG. 1).

The diffractive microlenses may also serve to distribute different beams on the same module (FIG. 1).

Thus, as compared with the conventional method of multilayer printed circuits, the connector associated with appropriate optical units in accordance with the invention makes it possible to separate the mechanical supporting function of the integrated circuits from the mixed function of distributing and/or transmitting the signals.

The invention also provides a communication protocol implanted in the connector circuits disposed relative to each other according to a predetermined geometrical relationship and intended to improve their optical interconnection.

According to the invention, provision is made for a first information feedback from the second connector CO2 for the benefit of the first connector CO1, using a first test signal TCR1 which will be described in greater detail below, emitted by the second connector CO2 for the attention of the first connector CO1 and representing the failing emitter elements of the first connector CO1 detected at the second connector by checking the reception condition mentioned above and described with reference to FIGS. 4 to 6.

Very advantageously, the emitter switching means COME as well as the main switching means COMD and the auxiliary switching means COMPIX of the first connector CO1 then organize the assignment of the electronic emission channels VOXE and of the electronic receiving channels VOXR of the said first connector CO1 by means of this first test signal TCR1, as described with reference to FIGS. 4 to 6.

Reciprocally, provision is made for a second information feedback from the first connector CO1 for the benefit of the second connector CO2, using a second test signal TCR2 which will be described in greater detail below, emitted by the first connector CO1 for the attention of the second connector CO2 and representing the failing emitter elements of the second connector CO2 detected at the first connector CO1, by checking the reception condition mentioned above and described with reference to FIGS. 4 and 6.

Very advantageously, the emitter switching means COME, as well as the main switching means COMD and the auxiliary switching means COMPIX of the second connector CO2 then organize the assignment of the electronic emission channels VOXE and of the electronic receiving channels VOXR of the second connector by means of this second test signal TCR2.

Such a protocol has the advantage of rendering the transmission of analog or digital data completely clear to the user who in the feedback at the connector CO1 has the logic signal TCR1 straightforwardly at his disposal, or at the second connector CO2 the logic signal TCR2, indicating:

that the transmission of a data block has passed without problems; this is a signal which is for example, equivalent to an acknowledgment signal;

that the failure in transmission is only temporary (switching of a standby emitter element), in which case the data block is retransmitted after a certain recovery time;

that it is impossible to recover the failure in transmission, for example, failure of the supply of the opposite circuit or an irreversible failure of the last standby emitter element.

According to another characteristic of this protocol in accordance with the invention, when a first connector circuit is energized, and when it is to emit signals towards a second connector facing it for example, provision is made to proceed at the first connector with a first control lying in checking whether one or several detector elements of the said first connector receive any incident radiation.

In the affirmative, the first connector then emits signals to one or several emitter elements to allow it to be recognized by the second connector.

To improve the use of the connectors in accordance with the invention, provision is moreover made for monitoring the emission power of the emitter elements, so that the latter should not exceed any values that are dangerous for the service life of the emitter elements, or so as not to saturate the detector elements facing them, for example.

It should be observed that this emission power depends on the technology of the laser diodes used, and also on their temperature.

In the event where the first connector emits signals but does not receive anything in return, provision is made for the first connector to effect immediately the first check such as mentioned above.

On the other hand, if the first connector detects incident signals, it must first of all make sure that the second connector circuit too, which for example is facing it, is receiving the data emitted by the first connector.

The first connector then informs the second connector so that it should, if required, adjust the power emitted to a nominal value.

In practice, when a detector detects the sudden breakdown of all the signals, it must signal a general fault and interrogate the connector facing it according to the first check mentioned above.

Figure 11:
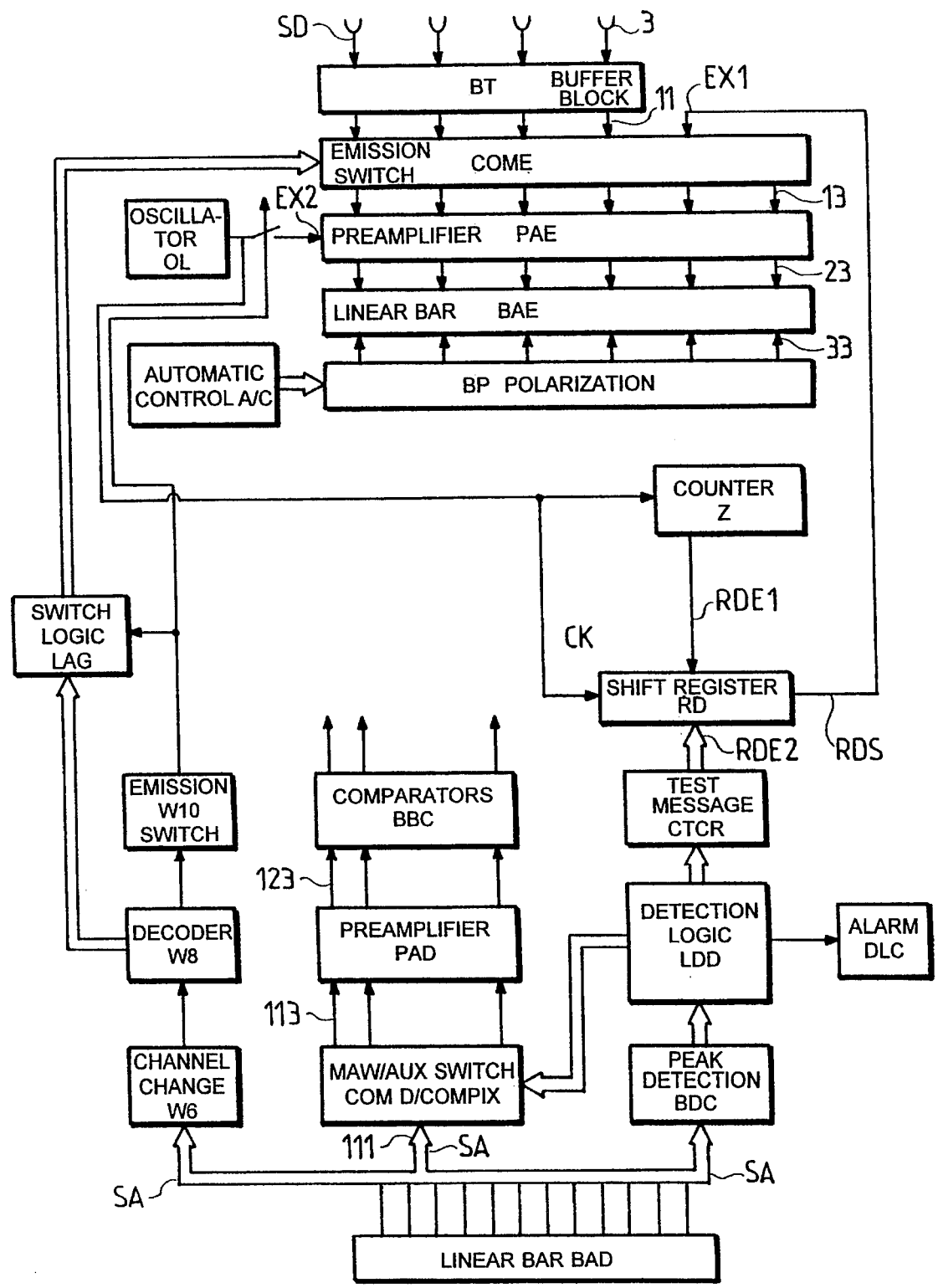
FIG. 11 is a schematic representation of the structural components of a connector in accordance with the invention.
Figure 12:
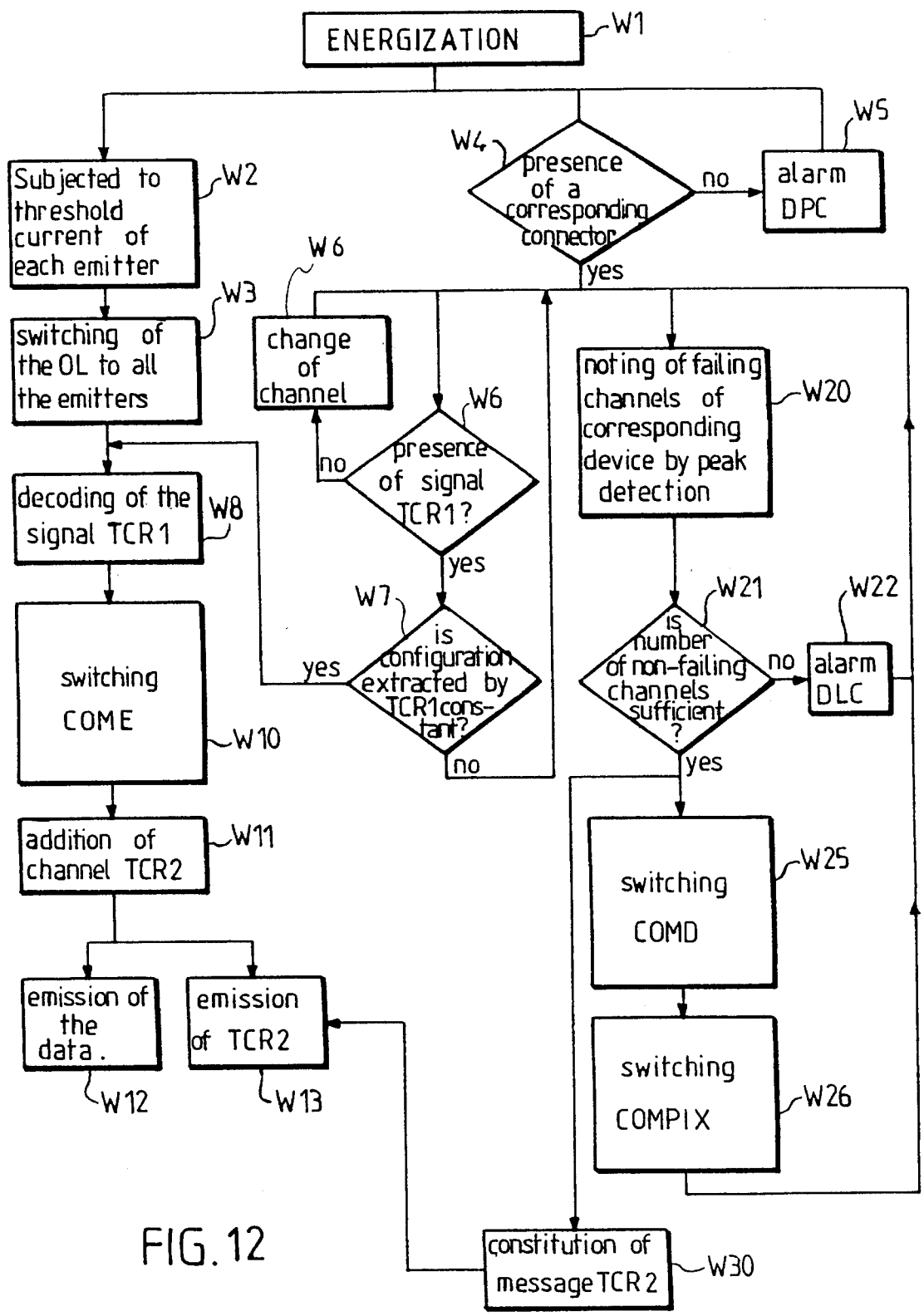
FIG. 12 is a flow chart illustrating the operation of the communications protocol of the installation in accordance with the invention.

Reference is now made to FIGS. 11 and 12 which schematically illustrate the operation in accordance with the invention.

On the emitter side, the outgoing signals SD first feed the inputs 3 of a buffer block BT. The outputs 11 of the block BT are connected to the switching/emission block COME.

The purpose of the switching/emission block COME is the switching of the outgoing signals SD in the case of a failure of one or two emitter elements according to the protocol described with reference to FIGS. 4 to 6.

The outputs 13 of the switching/emission block COME are connected to the block of preferably wide band preamplifiers PAE, whose outputs 23 are connected to the inputs of the bar BAE of emitter elements.

The bar BAE of emitter elements also receives signals coming from the outputs 33 of the polarization block BP fed by an automatic control/compensation block A/C.

If an emitter element is destroyed at the connector CO1, provision is made for a reorganisation of the electronic emission channels such as described with reference to FIG. 6.

If after this first failure, a second emitter element is destroyed, an additional displacement as mentioned above is effected.

This reorganisation of the emitter elements is effected by means of the test signal TCR1 created by the block CTCR of the connector circuit CO2.

The block CTCR of the connector CO2 applies the set of data constituting the signal TCR1 to the input RDE2 of a shift register RD.

The shift register RD loads the configuration of the reception channels of the connector CO2 via a counter block Z which applies to the input RDE1 of the shift register RD a loading signal, representing the pattern of the signal TCR1 described below.

A local oscillator OL delivers a sign CK to the counter block Z and to the shift register RD for serializing the signal TCR1.

The output RDS of the shift register RD connected to one input EX1 of an emission switch COME of the connector CO2 delivers the serialized signal TCR1 thus created.

On the detector side, at the level of the connector CO1, the incoming signals SA first of all feed the inputs 111 of the main switching means COMD and those of the auxiliary switching means COMPIX.

The object of the main switching means COMD and of the auxiliary switching means COMPIX is, in the case of a failure of transmission, to switch the incoming signals SA according to the protocol described with reference to FIGS. 4, 5, and 6.

The outputs 113 of the auxiliary switching block COMPIX are connected to the block of preferably wide band preamplifiers PAD whose outputs are connected to the inputs of a block BBC of comparators.

The detailed operation of the protocol in accordance with the invention will now be described with reference to FIGS. 11, 12 and 13.

On energizing a first connector, (step W1) an automatic control/compensation device A/C polarizes all the emitter elements, individually in a general case to avoid the problems of dispersion of the characteristics of the components of the bar of the emitter elements, or simultaneously in the case of homogeneous technology bars, as for example the bars of Multiple Quantum Well laser diodes, near their emission threshold (step W2), When this state has been stabilized, a signal coming from the local oscillator OL is switched simultaneously to each input of the preamplifiers PAE associated with each emitter element (step W3).

Thus in this new state, all the emitter elements emit in principle the same pulse train.

The control circuitry of the emitter elements is here constituted by two types of transistors, one BP of the low frequency type for the polarization of the emitter element at its threshold current, and the other PAE, of the high frequency or wide band type, with a constant peak amplitude current, for example, from 10 to 20 milliamps.

It is clear that the signals emitted at the time sequence of the local oscillator OL correspond not only to a presence signal, but will also allow the second connector circuit which is opposite the first connector circuit, to be aware as to how the bar of the emitter elements of the first connector is positioned (at least longitudinally relative to the bar of detector elements of the second connector) and to recognize the failing transmission channels both at the emission level (first connector) and at the receiving level (second connector) and vice versa.

To determine the failure of the transmission channels, the first connector circuit CO1 picks up the voltages of the received signals SA at the output of the peak detection block BDC associated with each detector subelement DND (step W20).

The peak voltage levels thus registered are subsequently compared with a predetermined threshold by the block BBC. For example, the threshold is chosen to be equal to half the nominal value of a predetermined incoming signal SA.

The result of this comparison, which is here the check of the reception condition described with reference to FIG. 4, is processed by an appropriate logic circuit LDD for detecting the failing transmission channels.

The detection logic circuit LDD then sets up the following procedure.

If the voltage level of all the incoming signals SA is substantially lower than the predetermined threshold (step W4), the logic circuit LDD delivers an alarm signal termed DPC standing for i.e. absence of corresponding connector ("Defaut Presence Correspondant") (step W5) which signifies that there is no second connector CO2 in dialogue with the first connector CO1.

If the voltage level of an incoming signal is substantially lower than the predetermined threshold amongst other signals having a peak voltage level that is substantially higher than the threshold, the transmission channel corresponding to the weak signal is declared to be failing by the logic circuit LDD.

In the case where the transmission channels that have been declared to be failing by the logic circuit LDD exceeds the number of standby detector elements (step W21), provision is made for activating the output state DLC standing for "Absence of Corresponding Laser" (step W22).

Otherwise, since the configuration of the receiving channels declared to be operative makes it possible to assign signals to available receiving channels, provision is made for reorganizing the electronic receiving channels by a main switching operation COMD and a auxiliary switching operation COMPIX according to the protocol mentioned above (steps W25 and W26) and described with reference to FIGS. 4, 5 and 6.

In parallel with this reorganisation, the test message TCR2 is set up by the block CTRC, which message takes into account the state of failure of the emitter elements of the second connector thus revealed (step W30).

Advantageously, this message TCR2 is intended for the corresponding connector which has emitted the incident signals to allow it to effect at its level an organisation of its electronic emission channels, taking into account the failure of the transmission channel thus revealed.

Provision is made for the signal TCR2 to be only emitted by the first connector CO1 when the latter is ready to receive the data emitted by the second connector CO2, that is to say, after having revealed the transmission channels which are a priori failing according to the protocol mentioned above.

In practice, the signal TCR2 is a serial two-phase signal whose output is independent of the line output of each electronic emission or receiving channel.

Figure 13:
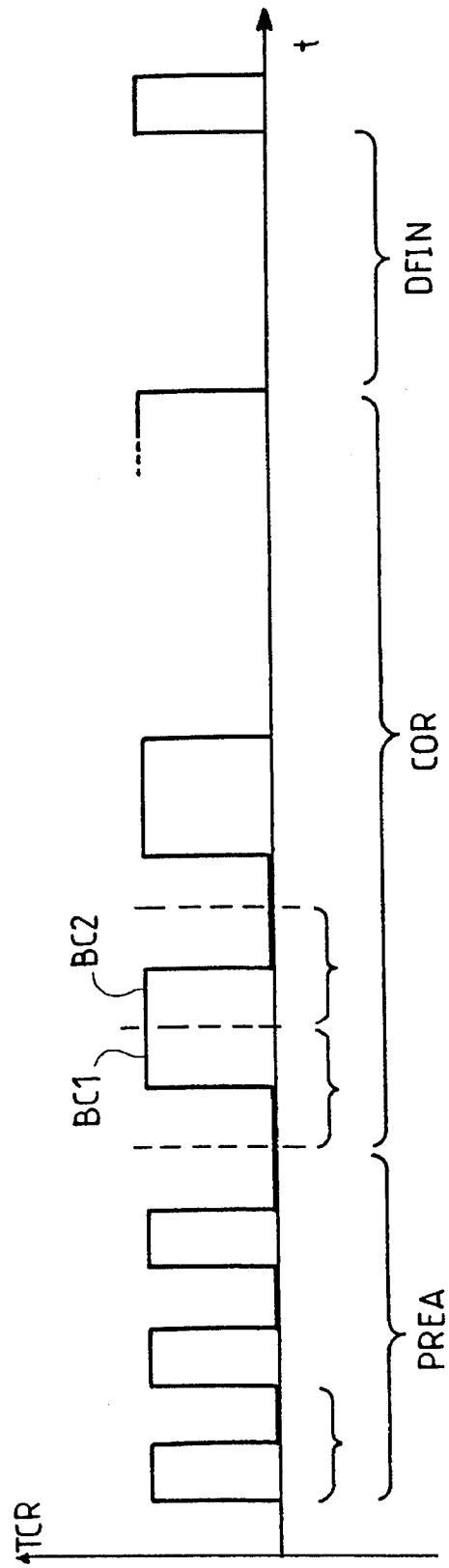
FIG. 13 is a time diagram of the signal for the configuration of the electronic receiving channels in accordance with the invention.

As represented in FIG. 13, the signal TCR includes a preamble PREA, a body COR constituting the configuration of the electronic transmission channels, and an end delimiter DFIN.

The preamble PREA comprises, for example, 3 bits.

The body COR is constituted by as many two-phase bits BC as there are detector elements.

The end delimiter DFIN is constituted, for example, by the suppression of the two-phase code over a predeterminable duration.

In practice, an incoming signal SA detected by the detector subelement whose peak voltage level is considered as valid by the logic circuit LDD has, for example, the result of setting to 1 the bit BC of the body assigned to the detector subelement.

The procedure continues as follows:

If the voltage level of the incoming signal SD is substantially higher than the predetermined threshold, the logic circuit LDD searches for a particular signal called TCR2 by exploring each electric receiving channel that has possibly been reorganized according to the above mentioned protocol (steps W6 and W6a).

The signal TCR2 is the homologue of the signal TCR1 and emanates from the first connector CO1 to the destination of the second connector CO2.

Advantageously, the signal TCR2 provides the second connector CO2 with information regarding the state of its emission channels.

When it recognizes the structure of the signal TCR1, the first connector CO1 then examines the stability of the configuration given by the signal TCR1.

If the signal TCR1 is stable (step W7), the first connector CO1 then decodes it (step W8), stops the emission of the local oscillator OL and configures the emission switch PAE (step W10) assigned to the emission of its signal TCR2 (step W11).

The configuration of the switch assigned to the emission of the signal TCR2 is effected by the switching logic circuit LAG from the information resulting from the comparison of the current signal TCR1 as compared with the preceding signal TCR1 (step W10a).

The switching of the channel TCR assigned to the emission of the signal TCR2 is then proceeded with (step W11), which signal is preferably positioned at one of the ends of the electronic emission channels.

In channel TCR, the emission of a signal TCR2 is proceeded with (step W13).

Simultaneously with the emission of the signal TCR2, the emission of the data is finally proceeded with (step W12).

Although the signal TCR2 or TCR1 is in principle only used to transmit the configuration of the validity of the transmission channels, provision may be made for an extension which subsequently simplifies the preamplifier PAD and the comparator block BCB.

Thus, after each bit BC configuring an electronic receiving channel, an adjusting bit BA is generated (with the same two-phase coding as BC).

This code BA allows, for example, the corresponding connector to adjust the peak-to-peak current of the preamplifier PAD associated with the same electronic receiving channel to an optimal chosen value.

Another solution lies in carrying, on the signal TCR1 or TCR2, alarm signals such as the alarms DLC or DPC.

There also exists the case where there is a risk of believing that a predetermined reception channel is failing when the data comprise a long sequence of 0s (there is no two-phase code on the data).

Now, since the first connector knows which are its inactive emitting inputs (for this purpose, it may, for example, monitor the level of the emission current of the emitter elements, as described above for the detector elements) and which are the electronic receiving channels that are operational on energization, one solution lies in transmitting to the corresponding second connector an inhibiting signal INH by means of the signal TCR1 which will prevent the corresponding second connector from sending back to it an erroneous signal TCR2 and starting the alarm DLC.

This solution obliges the second connector to base itself for the switching of the electronic receiving channels on the possible slip of the signal TCR1 (due to thermomechanical effects) and the memorization of the detector elements already declared to be failing.

Another solution for avoiding these zeros lies in overwriting the data signal.

Moreover, it is possible to make provision for several emitter elements for the same electronic transmission channel.

However, this solution has the drawback of requiring even more detector elements on the receiving side which is not compatible with the diameters of the conventional light beams.

It should be observed that the information feedback by means of the signals TCR1 and TCR2 makes it possible to detect also failures due, for example, to pollution of the external optical units OP, to the breakdown of a preamplifier, or even the separation of all or part of the set of the microlenses OP at the emission and/or at the receiving side.

I claim:

1. In an optoelectronic installation for the optical interconnection of first and second electronic modules including:
   (a) a first optical emitter element associated with said first module and fed by a first outgoing signal to be transmitted between said first module and said second module; and
   (b) a first optical receiver element associated with the second module, energized by the radiation emitted by said first emitter element and delivering a first incoming signal to said second module;
       said first and second modules being positioned relative to each other according to a predetermined geometrical relationship;
       the improvement wherein said first receiver element includes:
   (c) at least one detector element subdivided into at least first and second detector subelements each having a photosensitive section of a general elongate rectangular shape and disposed longitudinally opposite the radiation emitted by the first emitter element, the first and second detector subelements being disposed with their longer sides next to each other, with their substep chosen to be equal to, at most, strictly half of the step of the first emitter element;
   (d) an electronic receiving channel assigned to the first or second detector subelements; and
   (e) main switching means capable of electrically connecting the first or the second detector subelement to the electronic receiving channel in accordance with a predetermined reception condition relating to the signals received by the said first and second detector subelements, which allows said electronic receiving channel to deliver the first incoming signal to the second module in spite of a relative transverse or longitudinal displacement between the first and second modules.

2. An installation according to claim 1, wherein the predetermined reception condition includes a comparison of the level of the signals received by the first and second detector subelements of the detector element relative to a predetermined threshold; and wherein the main switching means switch the received signals, for which the result of the comparison is positive to the electronic receiving channel, the result of the comparison constituting information about the reception of the signals received as well as about the emission of the incident signals.

3. An optoelectronic installation for the optical interconnection of first and second electronic modules which face each other, wherein the second electronic module has a face which includes the first receiver element and also supports a second receiver element which is fed by a second outgoing signal to be transmitted between the said second module and the first module; wherein the first electronic module has a face which includes the first emitter element and also includes a second receiver element arranged according to claim 1, energized by the radiation emitted by said second emitter element and delivering a second incoming signal to said first module, which permits a bilateral transmission of data.

4. An optoelectronic connector arranged in the form of a specific emitter/receiver circuit; wherein it includes on the emitter side:
   (i) at least one linear bar constituted by a predetermined number of emitter elements having a chosen emitter step;
   (ii) a plurality of electronic emission channels assigned to said emitter elements;
   (iii) emitter processing means for said electronic emission channels;
       and wherein it includes on the receiving side:
   (iv) at least one linear bar constituted by a predetermined number of detector elements subdivided into detector subelements arranged according to claim 1, the detector bar being positioned in accordance with a predetermined geometrical relationship relative to the emitter bar;
   (v) a plurality of electronic receiving channels assigned to said detector elements;
   (vi) main switching means capable of electrically connecting one or the other of said detector subelements of each detector element to their associated electronic receiving channel according to a predetermined condition relating to the signals received by said detector subelements; and
   (vii) receiver processing means for the said electronic receiving channels.

5. A connector according to claim 4, wherein the number of emitter elements is greater than the number of electronic emission channels and than the number of signals to be transmitted; and wherein provision is moreover made for emitter switching means capable of electrically connecting said electronic emission channels to chosen emitter elements, which makes it possible to obtain standby emitter elements initially not assigned to electronic emission channels and which are capable of taking the place of the failing emitter elements.

6. A connector according to claim 5, wherein each electronic emission channel includes a preamplifier element including an input connected to the output of the emitter switching means and an output connected to the associated emitter element.

7. A connector according to claim 5, wherein, when an electronic emission channel is assigned to a failing emitter element, the emitter switching means switch said electronic emission channels to an operative emitter element and adjacent to the one that is failing, and connect the other electronic emission channels by a contiguous displacement to the other available emitter elements and, moreover, to a chosen standby emitter element.

8. A connector according to claim 5, wherein, when an electronic emission channel is assigned to a failing emitter element, the emitter switching means switch said electronic emission channel to an operative standby emitter element which is chosen at random.

9. A connector according to claim 4, wherein each electronic receiving channel includes a preamplifier element comprising an input connected to the output of the main switching means and one output connected to the receiver processing means.

10. A connector according to claim 4, wherein the number of detector elements is greater than the number of electronic receiving channels and the number of signals to be received; and wherein provision is moreover made for auxiliary switching means disposed between the main switching means and the electronic receiving channel, and comprising a plurality of auxiliary switches arranged according to a binary branched chain allowing the signals coming from said main switching means to be switched to chosen electronic receiving channels.

11. A connector according to claim 4, wherein the emitter and receiver processing means are accommodated in a microcontroller.

12. A connector according to claim 11, wherein the microcontroller is produced in a senficonductor alloy technology and selected from the group comprising Gallium arsenide (GaAs) and Galliron arsenide doped with Indimn (GAInAsP).

13. A connector according to claim 4, wherein the emitter elements are LASER diodes.

14. A connector according to claim 13, wherein the emitter elements are produced in a semiconductor alloy technology and selected from the group comprising Galliron arsenide (GaAs) and Gallium arsenide doped with Indimn (GAInAsP).

15. A connector according to claim 4, wherein the detector elements are PIN type photodiodes.

16. A connector according to claim 15, wherein the detector elements are produced in a semiconductor alloy technology and selected from the group comprising Gallium arsenide (GAAs) and Gallium arsenide doped with Indium (GAInAsP).

17. A connector according to claim 15, wherein the detector elements are produced in a semiconductor technology.

18. A connector according to claim 4, wherein the emitter elements are produced in a semiconductor technology and selected from the group comprising porous silicon and silicon carbide.

19. A connector according to claim 11, wherein the microcontroller is produced in a semiconductor technology.

20. A connector according to claim 4, wherein at least some of the emitter and detector bars are bonded or connected by connecting wires to the microcontroller.

21. A connector according to claim 4, wherein the emitter and/or detector bars are integrated into the technology of the microcontroller.

22. A connector according to claim 4, wherein near the external face of the connector, there is placed an optical unit having chosen optical properties comprising at least one of transmission, focusing, diffraction and refraction of the light beams.

\* \* \* \* \*